United States Patent
Bilke et al.

(10) Patent No.: US 9,152,797 B2
(45) Date of Patent: Oct. 6, 2015

(54) DEVICE AND METHOD FOR SECURE MEMORY ACCESS

(71) Applicant: BARCLAYS BANK PLC, London (GB)

(72) Inventors: Paul Bilke, Frisco, TX (US); Steven Bradley, Knutsford (GB); Andrew Crichton, Knutsford (GB); George French, Northampton (GB); Arthur Leung, London (GB); Michael Naggar, Frisco, TX (US); Ashutosh Sureka, Frisco, TX (US)

(73) Assignee: BARCLAYS BANK PLC, London (GB)

( * ) Notice: Subject to any disclaimer, the term of this patent is extended or adjusted under 35 U.S.C. 154(b) by 0 days.

(21) Appl. No.: 13/718,083

(22) Filed: Dec. 18, 2012

(65) Prior Publication Data

US 2014/0122901 A1 May 1, 2014

(30) Foreign Application Priority Data

Oct. 30, 2012 (GB) .................................. 1219514.5

(51) Int. Cl.
| | |
|---|---|
| *G06F 11/30* | (2006.01) |
| *G06F 12/14* | (2006.01) |
| *G06F 21/60* | (2013.01) |
| *G06F 21/34* | (2013.01) |
| *H04L 29/06* | (2006.01) |
| *G06F 21/57* | (2013.01) |
| *G06F 21/62* | (2013.01) |

(52) U.S. Cl.
CPC ................ *G06F 21/60* (2013.01); *G06F 21/34* (2013.01); *G06F 21/575* (2013.01); *G06F 21/6209* (2013.01); *H04L 63/0853* (2013.01); *G06F 2221/2143* (2013.01)

(58) Field of Classification Search
CPC ......... G06F 21/34; G06F 21/60; G06F 21/79; G06F 21/575; H04L 63/0853
USPC ........................................... 713/193
See application file for complete search history.

(56) References Cited

U.S. PATENT DOCUMENTS

| | | | | |
|---|---|---|---|---|
| 5,408,082 | A * | 4/1995 | Takagi et al. ................ | 235/492 |
| 6,490,646 | B1 * | 12/2002 | Leydier ........................ | 710/301 |
| 6,868,494 | B1 * | 3/2005 | Shitara et al. ............... | 713/189 |
| 7,428,754 | B2 * | 9/2008 | Neumann et al. ............. | 726/15 |
| 7,540,409 | B2 | 6/2009 | Van Overbeke et al. | |

(Continued)

FOREIGN PATENT DOCUMENTS

| | | |
|---|---|---|
| CN | 100555298 | 10/2009 |
| CN | 101334824 | 10/2011 |

(Continued)

*Primary Examiner* — Dant Shaifer Harriman
(74) *Attorney, Agent, or Firm* — Cowan, Liebowitz & Latman, P.C.; Steven D. Underwood

(57) ABSTRACT

In a secure computing environment, a method, system and device are provided for loading stored encryption key data from a protected non-volatile memory of a portable device. A boot loader program is initiated after the portable device is powered on, encryption key data is loaded from the protected non-volatile memory of the portable device, and access to the protected non-volatile memory is disabled after a predetermined time after the portable device is powered on. In this way, the encryption key data is loaded from the protected non-volatile memory of a portable device before the boot operating system is loaded.

11 Claims, 5 Drawing Sheets

(56) References Cited

U.S. PATENT DOCUMENTS

| | | | |
|---|---|---|---|
| 7,930,443 B1 * | 4/2011 | Sullivan | 710/20 |
| 8,024,790 B2 | 9/2011 | Zhao et al. | |
| 8,065,523 B2 * | 11/2011 | Fujii et al. | 713/165 |
| 8,341,423 B2 * | 12/2012 | Senda | 713/187 |
| 8,605,044 B2 * | 12/2013 | Nativel et al. | 345/173 |
| 8,782,804 B2 * | 7/2014 | Nagai et al. | 726/28 |
| 2003/0037237 A1 | 2/2003 | Abgrall et al. | |
| 2004/0177258 A1 | 9/2004 | Ong | |
| 2005/0246509 A1 * | 11/2005 | Topham et al. | 711/162 |
| 2006/0036872 A1 | 2/2006 | Yen | |
| 2006/0174109 A1 | 8/2006 | Flynn | |
| 2007/0067020 A1 | 3/2007 | Rea | |
| 2008/0307409 A1 | 12/2008 | Lu et al. | |
| 2009/0044268 A1 | 2/2009 | Tak | |
| 2009/0203355 A1 | 8/2009 | Clark | |
| 2009/0276534 A1 | 11/2009 | Jevans et al. | |
| 2009/0276617 A1 * | 11/2009 | Grell et al. | 713/2 |
| 2009/0276623 A1 | 11/2009 | Jevans et al. | |
| 2010/0064063 A1 | 3/2010 | Deforche et al. | |
| 2010/0250796 A1 | 9/2010 | Jevans et al. | |

FOREIGN PATENT DOCUMENTS

| | | | | |
|---|---|---|---|---|
| DE | 102004059265 | | 6/2005 | |
| DE | 102004023903 | | 12/2005 | |
| DE | 202010011707 | | 1/2011 | |
| EP | 1606914 | | 12/2005 | |
| EP | 1785902 | | 5/2007 | |
| EP | 1890420 | * | 2/2008 | ........ H04L 9/32 |
| EP | 2107463 | | 10/2009 | |
| EP | 2026213 | | 7/2011 | |
| EP | 2431906 | | 3/2012 | |
| EP | 2434424 | | 3/2012 | |
| EP | 2458569 | | 5/2012 | |
| GB | 2475787 | | 6/2011 | |
| WO | WO2004079988 | | 9/2004 | |
| WO | WO2005055018 | | 6/2005 | |
| WO | WO 2009/062965 | | 5/2009 | |
| WO | WO2009135196 | | 11/2009 | |
| WO | WO2009137371 | | 11/2009 | |
| WO | WO2011064539 | | 6/2011 | |

* cited by examiner

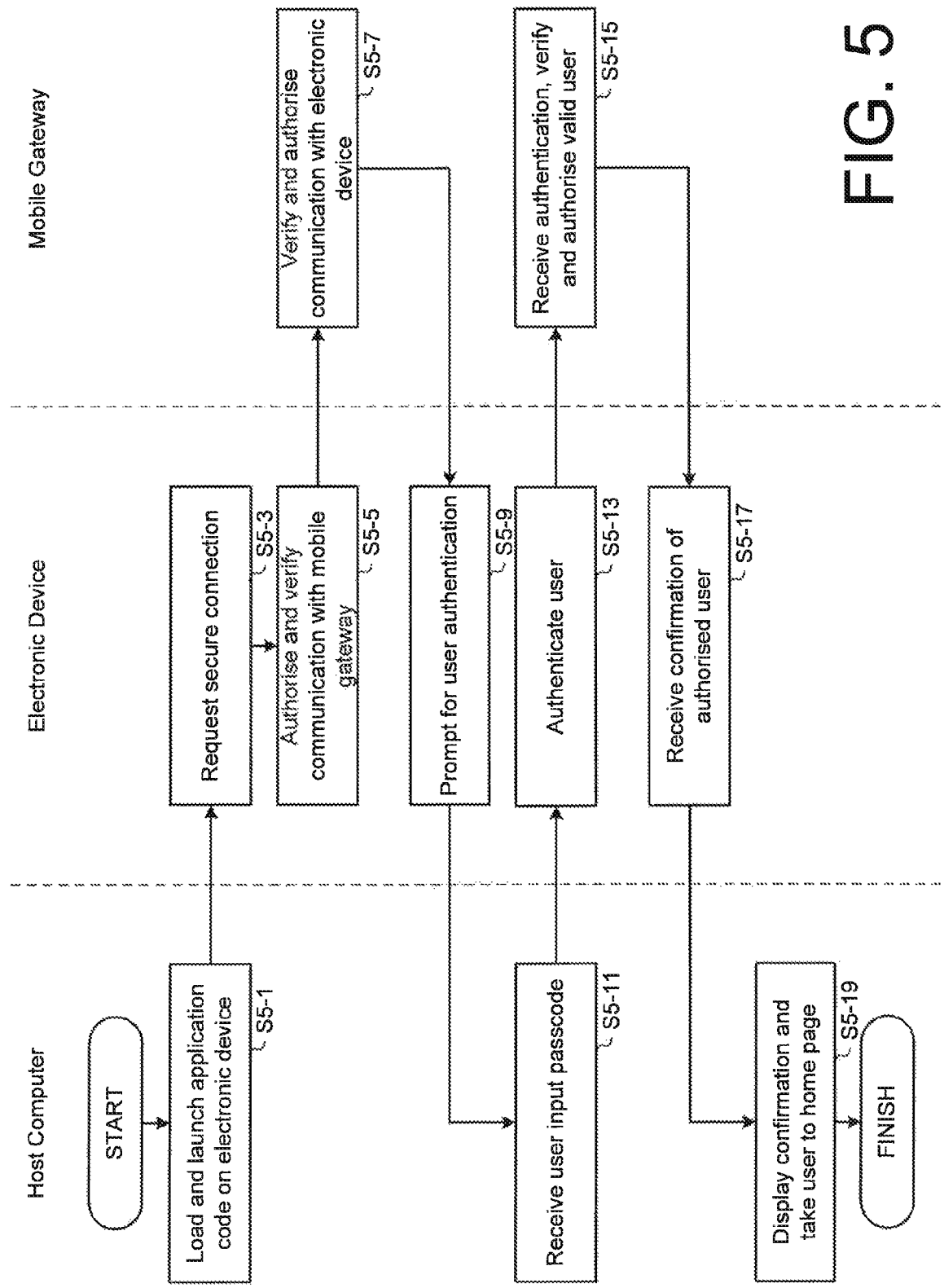

DEVICE AND METHOD FOR SECURE MEMORY ACCESS

FIELD OF THE INVENTION

This invention relates to secure data storage, access and communication, and more particularly to a system, device and method for providing enhanced secure access to protected non-volatile memory.

BACKGROUND OF THE INVENTION

Secure computing environments that store and run software applications from a portable electronic Universal Serial Bus ("USB") flash memory device plugged into a host computer are generally known, such as IronKey, Imation, Option CloudKey and Kobil mIDentity, in which secure authentication to the associated service and encryption is provided by the USB device itself. Typically in such environments, the USB flash memory devices are provisioned with one or more encryption keys that are used to authenticate, encrypt and decrypt program data. The encryption keys are stored within a non-volatile memory of the USB flash memory device, such as a non-volatile memory. Unauthorised access to the encryption key data in the memory poses a crucial security risk.

As such secure computing environments become more prevalent, there is a need for improved systems and techniques to provide enhanced protection and security of software application data and encryption key data that are stored in the protected memory of these USB flash memory devices.

STATEMENTS OF THE INVENTION

According to one aspect of the present invention, there is provided a method for loading stored encryption key data from a protected non-volatile memory of a portable device, comprising the steps of: initiating a boot loader program after the portable device is powered on; loading the encryption key data from the protected non-volatile memory of the portable device; disabling access to the protected non-volatile memory after a predetermined time after the portable device is powered on; and loading a boot operating system of the portable device to initiate at least one external communication interface of the portable device.

In this way, the encryption key data is loaded from the protected non-volatile memory of a portable device before the at least one external communication interface is initiated. Preferably, the predetermined time is a predefined number of clock cycles once the electronic portable device is powered on.

According to another aspect of the present invention, there is provided a method for providing secured access to encryption key data stored in a protected memory of a portable device, comprising the steps of: storing encryption key data in a protected non-volatile memory and enabling access to the stored encryption key data within a predetermined time after the portable device is powered on.

In a further aspect of the present invention there is provided a USB device, a data communication system, and associated computer programs arranged to carry out at least one of the above methods.

BRIEF DESCRIPTION OF THE DRAWINGS

There now follows, by way of example only, a detailed description of embodiments of the present invention, with references to the figures identified below.

FIG. 5 is a flow diagram illustrating the main processing steps performed by components of the computing environment of FIG. 1 for an example of a user authorization process.

DETAILED DESCRIPTION OF THE INVENTION

Secure Computing Environment

Portable USB flash memory devices that store and run software applications completely within the device itself are a way of providing flexible and mobile, yet highly secured and controlled access to online services in a secure computing environment, without using the network connection of the host computer to which the USB device is connected. In an online banking environment, for example, the USB device enables secure access to a user's financial account data and account services provided by an online banking backend system, via custom browser software securely stored on the device. The software is automatically loaded and executed by the USB flash memory device when connected to a host computer, to render an application user interface (UI) for display to the user in the host computer environment.

Figure 1:
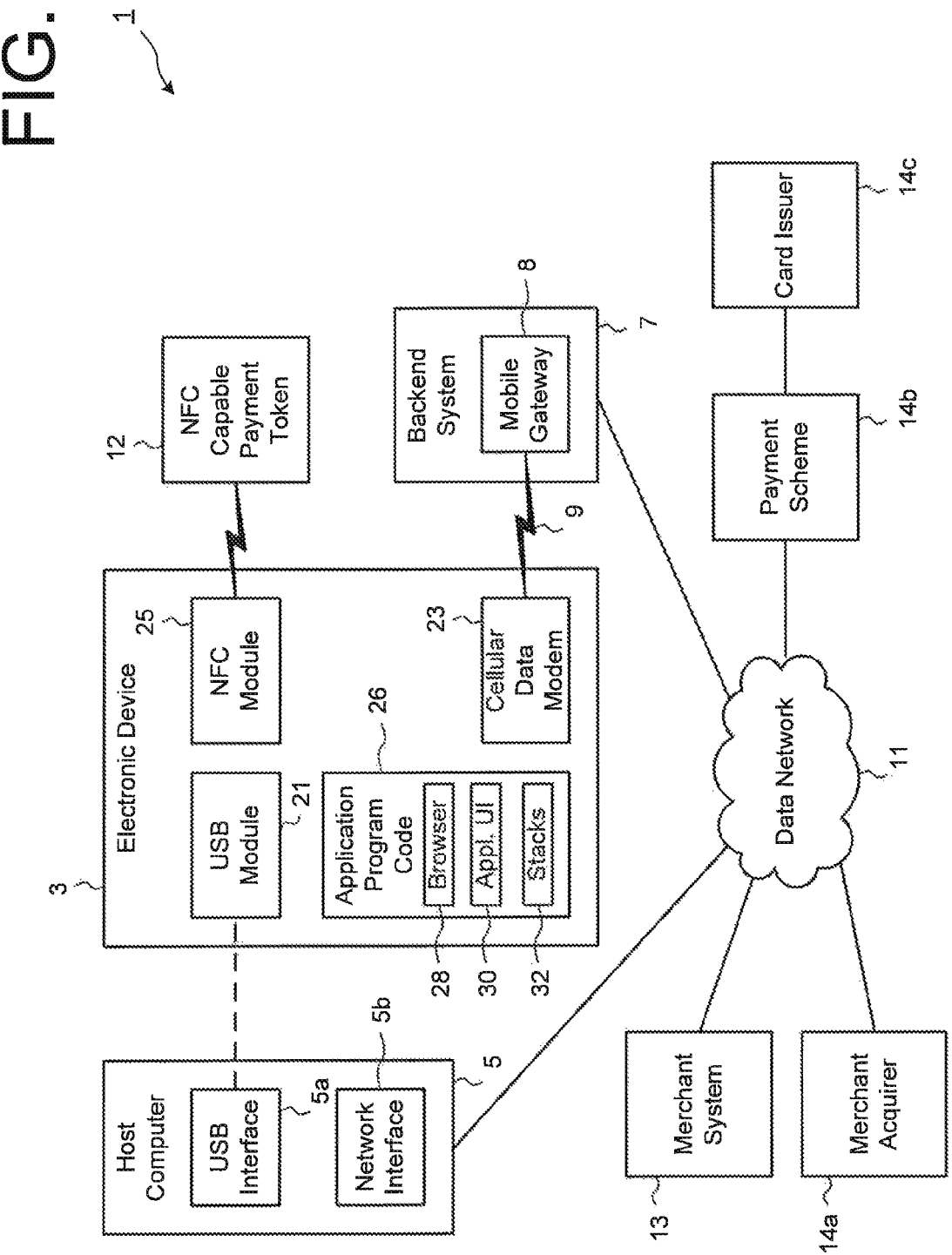
FIG. 1 is a block diagram showing the main components of a secure computing environment.

Referring to FIG. 1, a secure computing environment 1 is made up of a number of components: the electronic USB flash memory device (referred to herein as the "electronic device") 3, the host computer 5 and the backend system 7. The electronic device 3 is a secure and self-contained device with a USB serial communication module 21 for connecting the device to a USB interface 5a of the host computer 5. The electronic device 3 also includes an on-board cellular data modem 23 for secure network access to services provided by a backend system 7, via a direct and authenticated connection to a mobile gateway 8 of the backend system 7 over a cellular data network 9. The mobile gateway 8 may be a computer server providing APIs (Application Program Interfaces) to customer banking functionalities such as looking up an account balance, making payments, making transfers, etc. The cellular data network 9 may be any suitable cellular data communication network such as GPRS (General Packet Radio Service), EDGE (Enhanced Data-rates for Global Evolution), 3G (third generation of mobile phone mobile communications standards), LTE (Long Term Evolution), or 4G/fourth generation of mobile phone mobile communications standards), for example.

The USB serial communication module 21 provides a link between the custom browser application 28 and security and network stacks 32 on the electronic device 3, in order to translate and transmit HTTP/HTTPS requests from the browser application 28 running on the electronic device 3 via the host computer 5 over the USB serial communication module 21 and serial USB interface 5a, and to return the responses back to the browser application 28. Optionally, this USB serial communication module 21 can also include a set of interfaces that allow the custom browser application 28 access to custom functions on the electronic device 3.

The host computer 5, which can be a personal computer, portable laptop, tablet PC, or the like, typically communicates data over a data network 11 via a communication network interface 5b. The host computer 5 may also include components included in commonly known computing devices, such as a processor, a display, user input devices and controllers, etc., which are not shown for clarity. The data network 11 may be any suitable data communication network such as a wireless network, a local- or wide-area network including a corporate intranet or the Internet, using for example the TCP/IP protocol. Such communication protocols are of a type that are known to those skilled in the art of data networks and need not be described further.

Optionally, the electronic device 3 can include circuitry and logic to enable contactless payment transactions, such as a Near Field Communication (NFC) module 25 that communicates with an NFC capable payment token 12, such as an NFC payment card or NFC capable mobile device. Components of the host computer 5 can also be in communication with a merchant system 13, which could be, for example, a merchant's Point of Sale (POS) back-end system or an online merchant's website server system, as well as merchant acquirer 14a, payment scheme 14b and card issuer 14c components over the data network 11, which are typically provided for authorizing and settling payment transactions with the merchant system 13, and need not be described further.

In the normal user operation, the user plugs the electronic device 3 into the host computer 5 to automatically load and launch application program code 26 stored on the electronic device 3. In this exemplary embodiment, the application program code 26 includes an application UI 30, that can be built in HTML5 for example, and the custom browser application 28 that is used to render the application UI 30 to the user on the host computer 5. Preferably, the browser application 28 is customized to restrict use for only this device's application UI 30. The browser application 28 is coupled to the USB serial communication module 21 to make HTTP requests and receive responses via the electronic device 3 rather than directly using the host computer's network interface 5b.

Electronic Device Architecture

Figure 2:
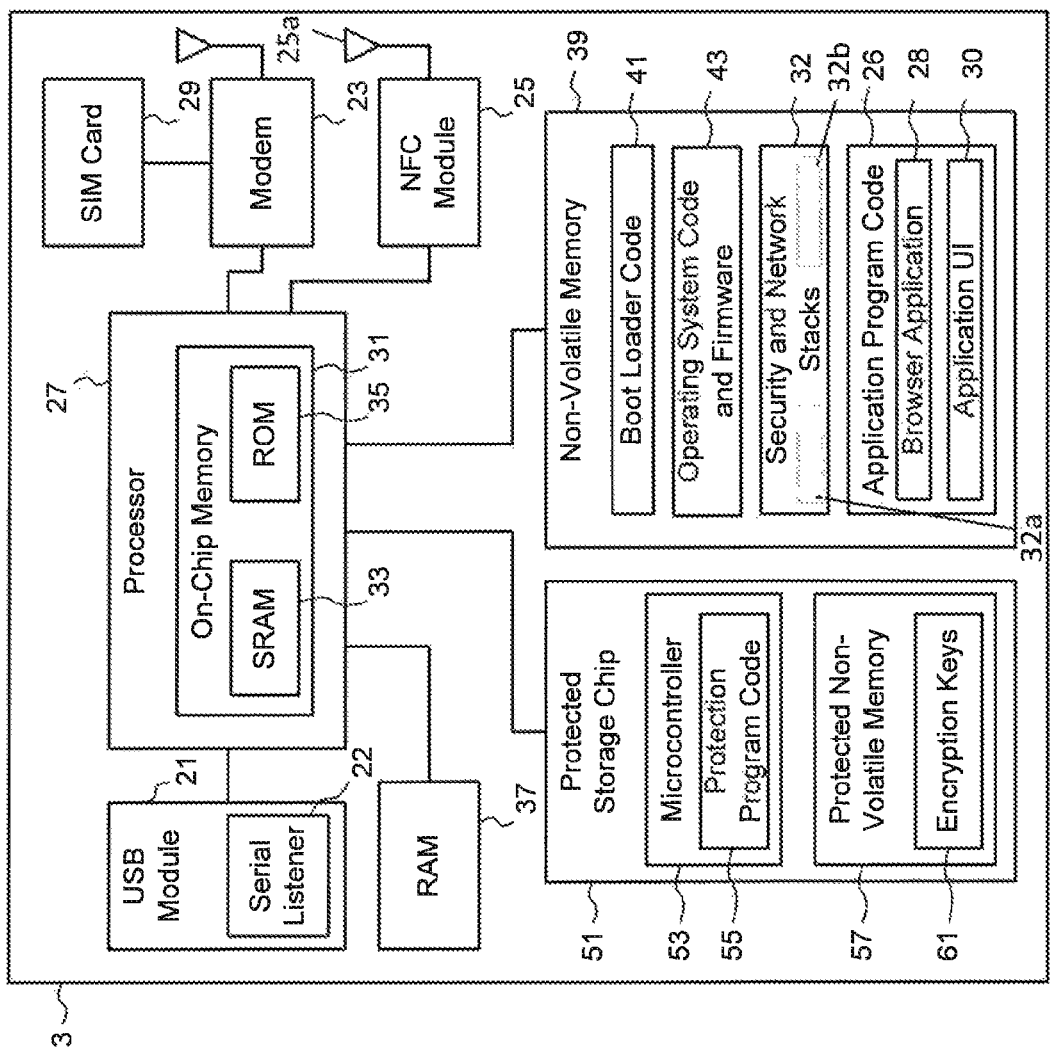
FIG. 2 is a block diagram showing the main components of an electronic device in the secure computing environment of FIG. 1 according to an embodiment of the invention.

Referring to FIG. 2, an electronic device 3 according to an embodiment of the invention includes the usb serial communication module 21 and modem 23, as discussed above, that are coupled to a processor 27. The electronic device 3 also includes a Subscriber Identity Module (SIM) 29 coupled to the modem 23 and optionally, an NFC module 25 and associated antenna 25a. The processor 27 may be any type of processor, including but not limited to a general-purpose digital signal processor or a special purpose processor, such as the i.MX28 Application Processor family by Freescale. The processor 27 itself includes on-chip memory 31, in the form of Static Random Access Memory (SRAM) 33 and Read Only Memory (ROM) 35. The processor 27 is also coupled for access to volatile Random Access Memory (RAM) 37 and non-volatile memory 39 of the electronic device 3, for example via a data bus (not illustrated for clarity).

The non-volatile memory 39 stores boot loader code 41 executing a boot loader program upon loading, operating system (OS) code and firmware 43, code for the security and network stacks 32, and code for application programs 26, including the custom browser application 28 and the application UI 30. The processor 27 runs the boot loader code 41 upon power up of the electronic device 3, to load the OS code 45, the security and network stacks 32 and the application program code 26 into RAM 37 for subsequent execution by the processor 27. The security and network stacks 32 include a cryptographic library that provides encryption and decryption functionality for data communicated to and from the electronic device 3.

The electronic device 3 is configured to route data traffic via the host computer 5, or via the onboard cellular data modem 23. The security stack 32a of the security and network stacks 32 consists of all the components necessary to ensure secure access to the electronic device 3, including device authorization, user authentication and network traffic encryption. The USB serial communication module 21 integrates with the security stack 32a to apply the necessary encryption and headers to the requests it receives from the browser application 28. The network stack 32b of the security and network stacks 32 consists of all the components necessary to make HTTP and HTTPS requests over the cellular data network 9 and the data network 11. The USB serial communication module 21 also integrates with the network stack to submit the requests it receives from the browser application 28. Optionally, the electronic device 3 is configured with logic to perform routing of requests based on predetermined factors, such as signal strength, bandwidth speed, network data charges, etc. For example, if the cellular data signal is found to be weak or unavailable, the network stack may route the request via the network interface 5b of the host computer 5.

Preferably, the non-volatile memory 39 is composed of one or more flash memory components, although other forms of non-volatile memory may be suitable. Optionally, the non-volatile memory 39 can be divided into logical storage partitions, for example, a main partition storing current firmware and application program code, a backup partition storing a working copy of backup firmware and application program code, and an updates partition storing new version of firmware and application program code installers. One or more further spare partitions may be provided for future applications.

The electronic device 3 further includes a protected storage module 51, also coupled to the processor 27. In this embodiment, the protected storage module 51 is a storage chip with a dedicated microcontroller (or microprocessor) 53 for executing protection program code 55 that controls access to encryption key data 61 stored in protected non-volatile memory 57 on the storage chip 51. The protection program code 55 controls access to the protected non-volatile memory 57 by making the stored encryption key data 61 available only during a pre-defined time window. Preferably, the protected non-volatile memory 57 is only addressable for a pre-defined number of clock cycles once the electronic device 3 is powered on.

The loading of the encryption key data 61 is carried out as one of the initial steps in a boot loading (or bootstrapping) process and prior to initiating and accepting any external communications to the electronic device 3. During operation of the boot loading process, the encrypted boot loader code 41 is loaded by the processor 27 from the non-volatile memory 39 to RAM 37, and executed to load the encryption key data 61 from the protected storage chip 51 during the pre-defined time window for addressing the protected non-volatile memory 57. The loaded encryption keys 61 are then available for subsequent use by the processor 27, for example, when executing the OS code 43 and the application program code 45 to authenticate a user of the electronic device 3 and to handle service requests to and from the backend system 7. Thereafter, the processor 27 in the boot loader mode executes the remaining instructions to continue normal loading of the boot OS code and initialisation of the external communication interfaces, such as the USB serial communication module 21 and the modem 23.

Figure 3:
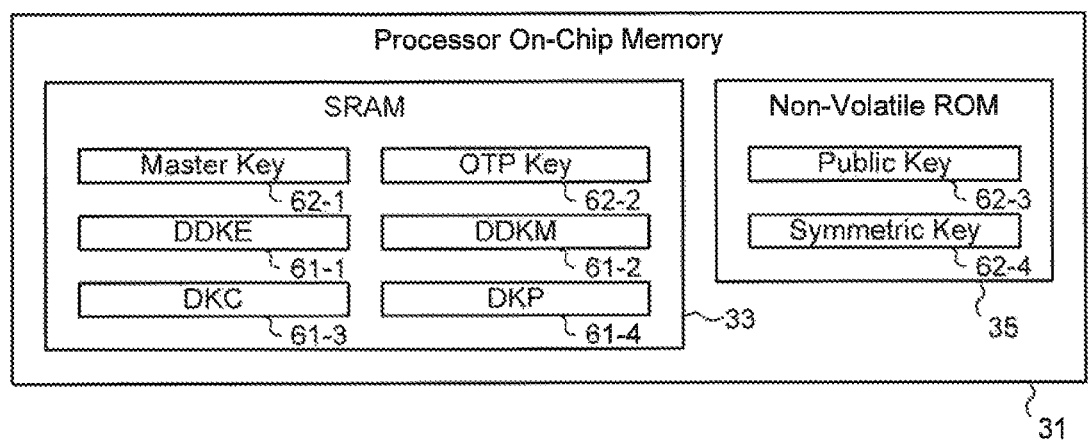
FIG. 3 is a block diagram showing an example of encryption key data stored in the on-chip memory of the electronic device shown in FIG. 2.

In an exemplary embodiment, the encryption key data 61 includes a Device Derivation Key for Encryption ("DDKE") 61-1, a Device Derivation Key for Message Authentication Coding—MAC'ing ("DDKM") 61-2, a Device Key for Credential Protection ("DKC") 61-3 and a Device Key for Policy/Command authentication ("DKP") 61-4. On device bootup, these encryption keys 61 are loaded into predefined memory slots of the SRAM 33 on the processor 27, as schematically illustrated in FIG. 3. Additional encryption keys 62 may also be loaded into the on-chip memory 31, such as one or more master derivation keys 62-1 and an OTP hardware key 62-2 also loadable into the on-chip SRAM 33, and a public key 62-3 and a symmetric key 62-4 loadable into the on-chip ROM 35.

The encryption keys 61 and 62 can be used for message encryption, message authentication ("MAC"), credential encryption and policy/command authentication. For example, the two DDKs (DDKE 61-1 and DDKM 61-2) can be used by the electronic device 3 to create session based keys for each transaction between the electronic device 3 and the backend system 7, which allows the electronic device 3 to communicate in a secure and authenticated way with backend systems 7. The session keys can be generated by each electronic device 3 using the appropriate Device Derivation Key, generated per message to and from the electronic device 3 and the backend system 7. The static Device Keys for credential protection 61-3 and Policy/Command authentication 61-4 can be used to validate commands sent to the electronic device 3 from the backend system 7 and the protection of the user entered credentials for transmission to the backend system 7, respectively. The static User Credential Protection Key 61-3 allows user credentials to be protected for transmission to and processing on the backend system 7. The static Policy/Command Key 61-4 allows the electronic device 3 to validate instructions from the backend system 7 which will alter the operation of the electronic device 3. The master derivation keys 62-1 can used during the creation of the electronic device 3 allowing a unique key set to be installed into each instance of an electronic device 3.

By generating a set of device specific encryption keys 61 for each electronic device 3, a fine level of control may be exercised by the backend systems 7 and a specific electronic device 3 may be effectively authernticated. Preferably, the encryption keys 61 can be wrapped for secured transport between the backend system 7 and the electronic device 3 during provisioning. The wrapping can be based on, for example:

- a Device Transport Key ("DTK") determined from a unique serial number and an OTP hardware key that is the burnt into the electronic device at manufacture and protected such that it cannot be read out programmatically,
- a Device Transport Message Authentication Coding (MAC) Key (DTMK) used to MAC the wrapped encryption keys 61 for transport, and
- a Device Unique Key (DUK) generated by the processor combining the OTP key and various unique fields from a fuser bay, etc.

Each encryption key 61 can be wrapped under the DTK, concatenated and MAC'd. The overall message block can be type-length-value ("TLV") encoded and then protected during transport via Transport Layer Security ("TLS"). On boot, the wrapped encryption keys 61 can be unwrapped and loaded into respective slots in the on-chip memory 31.

Optionally, the electronic device 3 can be further adapted to include circuitry and logic to provide a defense against subversion of hardware attacks, such as voltage tampering, etc.

By controlling access to the protected non-volatile memory 57 in this way, persistent storage of the encryption keys is facilitated without comprising security of the secure computing environment. The encryption keys 61 are wrapped for storage within the new protected storage chip 51 and the microcontroller 53 functions to securely load the encryption keys 61 into the SRAM 33 of the on-chip memory 31 for use by the processor 27 of the electronic device 3. Another advantage is that the design does not affect existing cryptographic processes of the keys for encryption and the MAC'ing processes can safely assume that the encryption keys 61 are loaded in place prior to execution of application program code 26 by the processor 27.

Boot Load Process

An embodiment of a process of boot loading the electronic device 3 will now be described with reference to FIG. 4, to illustrate the technical advantage of the secure data access embodiment described above. Booting (or booting up) is the initial set of operations that the computer system of the electronic device 3 performs when electrical power is switched on. The booting process begins when the electronic device 3 that has been turned off is re-energized, and ends when the electronic device 3 is ready to perform its normal operations.

Figure 4:
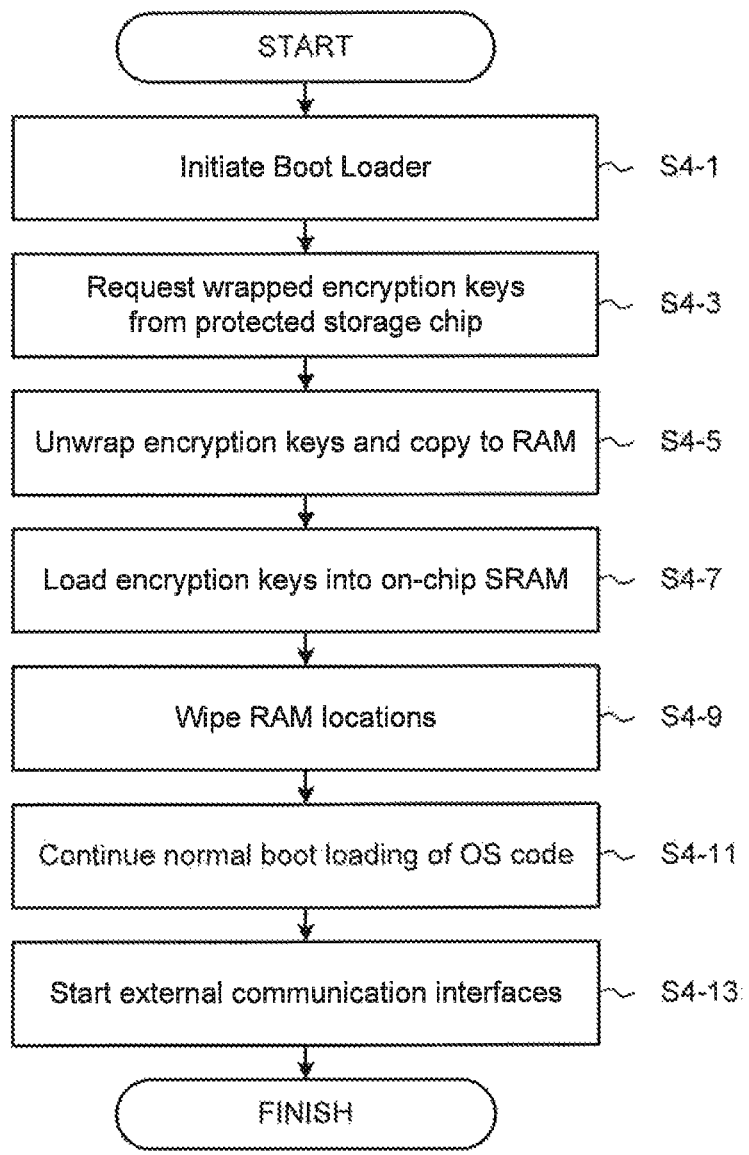
FIG. 4 is a flow diagram illustrating the main processing steps performed by the electronic device of FIG. 2 according to an embodiment.

Referring to FIG. 4, the boot loading process begins at step S4-1 where the processor 27 initiates execution of the boot loader code 41 stored in the non-volatile memory 39. Optionally, the boot loader code 41 is encrypted to provide an additional layer of security and the processor 27 can decrypt the encrypted boot loader code 41 using the master key 62-1, before execution of the binary code. The boot loader code 41 may include instructions for the processor 27 to conduct one or more initial self-tests to confirm that components of the electronic device 3 are in working order. At step S4-3, the processor 27 proceeds to request loading of the encryption keys 61 from the protected storage chip 51. Preferably, the encryption keys 61 are wrapped using device keys as discussed above. In an embodiment, the boot loader code 41 includes instructions for addressing the protected non-volatile memory 57 via the microcontroller 53 to retrieve the encryption keys 61. As discussed above, the microcontroller 53 of the protected storage chip 51 is configured with protection program code 55 to allow or enable the protected non-volatile memory 57 to be addressable for a pre-defined number of clock cycles after the system has powered on, such that the wrapped encryption keys 61 are only available during this period of time.

At step S4-5, the processor 27 unwraps the encryption keys 61, if necessary before loading a copy of the unwrapped encryption keys 61 to RAM 37. At step S4-7, the processor 27 loads the unwrapped encryption keys 61 from RAM 37 into the SRAM 33 of the processor on-chip memory 31. The processor 27 then wipes the RAM 37 locations of the unwrapped encryption keys 61, at step S4-9. It will be appreciated that as an alternative, the system architecture may be configured to enable direct loading of the unwrapped encryption keys 61 from the protected storage chip 51 to the on-chip memory 31. However, this is less preferable and the on-chip memory 31 may not facilitate direct loading of the encryption keys 61 for additional security.

Once the unwrapped encryption keys 61 have been loaded into SRAM 33, the processor 27 continues the normal boot loading process at step S4-11 and loads the OS code 43 from the non-volatile memory 39 into RAM 37 for execution. During the normal boot loading operations, the processor 27 starts the external communication interfaces, illustrated at step S4-13, such as the USB serial communication module 21 and the modem 23. Thereafter, the processor 27 may transition to a user operator mode and automatically load the application program code 45 from the non-volatile memory 39 to RAM 37 for execution during normal user operation to carry out a process of device and user authentication.

Device and User Authentication Process

An exemplary embodiment of the process of device and user authentication using the electronic device 3 will now be described with reference to FIG. 5. At step S5-1, the user plugs the electronic device 3 into the host computer 5 to automatically load and launch application program code 26 stored on the electronic device 3. In the exemplary embodiment, the custom browser application 28 is launched and used to render and display the application UI 30 to the user in the host computer 5 environment. The user can interact with the application UI 30 being displayed in the browser 28 by clicking a link or a button to select one or more functions or services that requires communication with the mobile gateway 8 of the backend system 7. In response, the browser application 28 sends a data request to a serial communication handler (not illustrated) on the host computer 5, responsible for interfacing with the USB serial communication module 21 of the electronic device 3. The serial communication handler sends the data requests to a serial listener 22 of the USB serial communication module 21 via a USB serial driver installed on the host computer 5.

At step S5-3, the processor 27 of the electronic device 3 requests a secure connection to the mobile gateway 8 of the backend system 7 over the cellular data network 9, before user requests can be securely communicated with the backend system 7. Accordingly, at step S5-5, authentication and authorization of the electronic device 3 is processed, by authorizing and verifying communication with the mobile gateway 8. The requests are encrypted by the security stack 32a using the encryption keys 61 loaded into the SRAM 33 during the secure boot loading process described above.

In an exemplary implementation, the serial listener 22 of the USB serial communication module 21 sends the data request to the cryptography library of the security and network stacks 32, to encrypt the data request using the encryption keys 61. The serial listener 22 submits the request to the network stack 32b, which first checks if good cellular signal strength is available via the cellular data modem 23. If a strong cellular signal is detected, the data request is sent to the mobile gateway 8 over the cellular data network 9. Otherwise, the request can be submitted using the host computer 5 network interface 5b over the data network 11. It will be appreciated that this is one example of a possible data routing process by the electronic device 3, and in other examples, the routing decision can instead or additionally be based on other predetermined cellular network-related factors, such as bandwidth speed, network data charges, etc. If the request is sent over the cellular data network 9, the data request is converted into an encrypted HTTPS request using an Open SSL Library and passed to the cellular data modem 23, which transmits the request to the mobile gateway 8. On the other hand, if the request is sent using the host computer 5 network interface 5b, the serial listener 22 sends the request to the host computer 5 via the USB serial interface 5a. The HTTPS request is sent by the host computer 5 to the mobile gateway 8 over the data network 11 (e.g. the Internet) via the network interface 5b.

At step S5-7, the mobile gateway 8 authorises and verifies communication with the electronic device 3, in a corresponding manner. The electronic device 3 processes authentication of the user after the electronic device 3 has been authenticated. At step S5-9, the electronic device 3 prompts the user for authentication. User authentication can take one or more of any known forms, for example, by prompting the user to input a pre-registered passcode via the application UI 30 and browser application 28, or via additional communication interfaces (not shown) that are made available on the device, such as a thumbprint scanner, dials or buttons to select passcode digits, etc. At step S5-11, the host computer 5 receives user input of a passcode via the application UI 30. The user input passcode is verified by the electronic device 3 against a stored pre-registered passcode in order to authenticate the user at step S5-13. At step S5-15, authentication of the user is securely communicated to the mobile gateway 8, which verifies that the user is valid by comparing received details with stored records for the user.

At step S5-17, the electronic device 3 receives confirmation from the mobile gateway 8 that the user is authorised. In response to confirmation that both the electronic device 3 and the user are authenticated and authorised, the browser application 28 and application UI 30 display confirmation to the user and proceed with normal user operation at step S5-19 by displaying to the user a secure web home page for the services provided by a backend system 7.

Alternative Embodiments

It will be understood that embodiments of the present invention are described herein by way of example only, and that various changes and modifications may be made without departing from the scope of the invention.

For example, in the embodiments described above, the portable electronic device is a USB device. It will be appreciated that the data communication interface may be any form of standard or proprietary computing interface between the portable device and a host computing device or platform, such as IEEE 1394 (Firewire), SCSI, Thunderbolt, Lightning, etc, although in some cases, a separate power source would be required.

In the embodiments described above, the electronic device is powered by the host computer via the USB interfaces when connected. Optionally, the electronic device can include a battery and associated power charging circuitry, for powering the components of the device and enabling persistent storage of data in volatile memory if necessary.

In the embodiments described above, the cellular data network 9 and the data network 11 are illustrated as separate networks. It will be appreciated that the data network itself can include communication links or paths over a cellular communication network such as GPRS, EDGE, 3G, 4G, LTE, for example, or a combination of such communication paths.

The encryption keys and passcodes described above may take any respective form, and may be composed of numeric or alphabetic symbols, non-alphanumeric symbols, or a combination of such symbols.

Various software implementations are described in terms of the exemplary electronic device. After reading this description, it will become apparent to a person skilled in the art how to implement the invention using other computer systems and/or computer architectures.

The computer programs (also called computer control logic) discussed in the embodiments above, when executed, enable the computer system of the electronic device to implement embodiments of the present invention as discussed herein. Accordingly, such computer programs represent controllers of the computer system. Where the embodiment is implemented using software, the software may be stored in a computer program product and loaded into the computer system using a removable storage drive, hard disk drive, or communication interface, to provide some examples. The terms "computer program medium" and "computer usable medium" are used generally to refer to media such as removable storage drive, a hard disk installed in hard disk drive, and signals. These computer program products are means for providing software to computer system of the electronic device. However, these terms may also include signals (such as electrical, optical or electromagnetic signals) that embody the computer program disclosed herein.

Alternative embodiments may be implemented as control logic in hardware, firmware, or software or any combination thereof. Further alternative embodiments may be envisaged, for example with variations and modifications to the particular sequence of steps described in the embodiments above, which nevertheless fall within the scope of the following claims.

What is claimed is:

1. A computer-implemented method of loading stored encryption key data from a protected non-volatile memory of an electronic device, comprising the steps of:
   executing boot loader code after the electronic device is powered on, then loading the stored encryption key data from the protected non-volatile memory of the electronic device;
   after said loading, determining that a pre-defined number of clock cycles has elapsed from the time the electronic device is powered on;
   disabling access to the stored encryption key data and the protected non-volatile memory of the electronic device after it is determined that the pre-defined number of clock cycles has elapsed; and
   processing routine boot loading operations after the encryption key data is loaded to working memory, the routine boot loading operations including initiating at least one external communication interface of the electronic device, whereby the at least one external communication interface cannot be operated prior to the loading of the encryption key, the disabling of access to the stored encryption key, and the disabling of the protected non-volatile memory.

2. The method of claim 1, wherein the stored encryption key data is loaded from the protected non-volatile memory of a protected storage chip the electronic device.

3. The method of claim 2, wherein the stored encryption key data is loaded to a volatile memory on the electronic device.

4. The method of claim 3, wherein the volatile memory is provided on a processor of the electronic device.

5. The method of claim 1, wherein the at least one external communication interface comprises one or more of a Universal Serial Bus (USB) interface, a modem and a Near Field Communication (NFC) interface.

6. The method of claim 1, wherein the electronic device is powered through a USB interface when connected to a host computer.

7. The method of claim 2, wherein the protected storage chip further comprises a microcontroller for disabling access to the protected non-volatile memory.

8. The method of claim 7, wherein the microcontroller controls access to the protected non-volatile memory by enabling and disabling access to memory addresses of the protected non-volatile memory.

9. The method of claim 1, further comprising loading and running application program code stored in the electronic device when the electronic device is plugged into a host computer.

10. The method of claim 9, wherein the application program code uses the stored encryption key data to encrypt data for communication over the at least one external communication interface.

11. The method of claim 1, wherein stored encryption key data in the protected non-volatile memory are wrapped using device specific keys, and unwrapped after loading from the protected non-volatile memory.

* * * * *